United States Patent
Laghezza et al.

(10) Patent No.: US 12,535,557 B2
(45) Date of Patent: Jan. 27, 2026

(54) RADAR SYSTEM AND CORRESPONDING OPERATING METHOD

(71) Applicant: NXP B.V., Eindhoven (NL)

(72) Inventors: Francesco Laghezza, Eindhoven (NL); Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 422 days.

(21) Appl. No.: 18/174,279

(22) Filed: Feb. 24, 2023

(65) Prior Publication Data

US 2023/0280447 A1 Sep. 7, 2023

(30) Foreign Application Priority Data

Mar. 3, 2022 (EP) ..................................... 22160101

(51) Int. Cl.
- G01S 7/35 (2006.01)
- G01S 13/58 (2006.01)
- G01S 13/931 (2020.01)

(52) U.S. Cl.
CPC ............ G01S 7/354 (2013.01); G01S 13/584 (2013.01); G01S 13/931 (2013.01)

(58) Field of Classification Search
CPC ...... G01S 13/584; G01S 13/931; G01S 7/023; G01S 7/356; G01S 7/354; G01S 7/40
USPC ......... 342/109, 108, 195, 192, 145, 194, 91, 342/102
See application file for complete search history.

(56) References Cited

U.S. PATENT DOCUMENTS

| | | | | |
|---|---|---|---|---|
| 4,401,987 A | * | 8/1983 | Cyr | G01S 7/536 367/2 |
| 4,739,329 A | * | 4/1988 | Ward | G01S 7/295 342/119 |
| 5,337,054 A | * | 8/1994 | Ross | G01S 7/34 342/91 |
| 5,652,651 A | * | 7/1997 | Dunne | G01S 17/10 342/91 |
| 5,880,821 A | * | 3/1999 | Dunne | G04F 10/105 356/28 |

(Continued)

OTHER PUBLICATIONS

Jin, B., "One-Bit LFMCW Radar: Spectrum Analysis and Target Detection", IEEE Transactions on Aerospace and Electronic Systems, vol. 56, No. 4, Mar. 5, 2020.

(Continued)

*Primary Examiner* — Michael W Justice

(57) ABSTRACT

In accordance with a first aspect of the present disclosure, a radar system is provided, comprising: a plurality of receive channels; a first radar detector stage configured to detect, through said receive channels, at least one target using a detector threshold; a noise correlation determination unit configured to determine a noise correlation level indicative of noise correlation between the receive channels if the first radar detector stage has detected the target; a detector threshold adjustment unit configured to adjust the detector threshold in dependence on the noise correlation level determined by the noise correlation determination unit; a second radar detector stage configured to detect the target using the adjusted detector threshold. In accordance with a second aspect of the present disclosure, a corresponding method of operating a radar system is conceived.

18 Claims, 11 Drawing Sheets

(56) References Cited

U.S. PATENT DOCUMENTS

| | | | |
|---|---|---|---|
| 7,072,618 B1* | 7/2006 | Strutt | H04B 1/70755 |
| | | | 375/150 |
| 7,305,190 B2* | 12/2007 | Mayampurath | H03F 3/087 |
| | | | 398/209 |
| 7,430,254 B1* | 9/2008 | Anderson | H04B 1/69 |
| | | | 375/350 |
| 7,812,759 B2* | 10/2010 | Kai | G01S 13/34 |
| | | | 342/107 |
| 8,102,302 B2* | 1/2012 | Alon | G01S 7/285 |
| | | | 342/36 |
| 8,199,046 B2* | 6/2012 | Nanami | G01S 13/867 |
| | | | 342/52 |
| 8,392,149 B1* | 3/2013 | Spencer | G01S 7/021 |
| | | | 702/193 |
| 9,166,682 B2* | 10/2015 | Renaudier | H04B 10/0795 |
| 9,553,693 B2* | 1/2017 | Logan | H04W 24/02 |
| 9,887,799 B2* | 2/2018 | Logan | H04L 43/087 |
| 11,010,605 B2* | 5/2021 | Nord | G06F 18/285 |
| 11,269,042 B2* | 3/2022 | Kishigami | G01S 7/2883 |
| 11,313,948 B2* | 4/2022 | Longman | G01S 7/40 |
| 11,415,682 B1* | 8/2022 | Clark | G01S 7/4861 |
| 11,644,555 B2* | 5/2023 | Ding | G01S 15/104 |
| | | | 367/99 |
| 11,644,557 B2* | 5/2023 | Cottron | G01S 13/282 |
| | | | 342/201 |
| 12,174,312 B2* | 12/2024 | Gianelli | G01S 7/4086 |
| 2007/0171122 A1* | 7/2007 | Nakano | G01S 7/023 |
| | | | 342/91 |
| 2009/0160708 A1* | 6/2009 | Nakano | G01S 7/4021 |
| | | | 342/385 |
| 2009/0251355 A1* | 10/2009 | Nanami | G01S 13/867 |
| | | | 342/70 |
| 2009/0322592 A1* | 12/2009 | Kai | G01S 13/34 |
| | | | 342/107 |
| 2011/0014880 A1* | 1/2011 | Nicolson | G01S 7/034 |
| | | | 716/132 |
| 2011/0285572 A1* | 11/2011 | Alon | G01S 7/285 |
| | | | 342/37 |
| 2012/0269507 A1* | 10/2012 | Renaudier | H04B 10/0795 |
| | | | 398/34 |
| 2015/0139368 A1* | 5/2015 | Abrishamkar | H04L 25/025 |
| | | | 375/346 |
| 2016/0380654 A1* | 12/2016 | Logan | H04K 3/42 |
| | | | 375/296 |
| 2016/0380717 A1* | 12/2016 | Logan | H04K 3/28 |
| | | | 375/238 |
| 2020/0003887 A1* | 1/2020 | Matsumura | G01S 13/931 |
| 2020/0033462 A1* | 1/2020 | Ding | G01S 7/536 |
| 2020/0096595 A1* | 3/2020 | Kishigami | G01S 7/295 |
| 2020/0158847 A1* | 5/2020 | Cottron | G01S 13/48 |
| 2021/0011123 A1* | 1/2021 | Longman | G01S 7/40 |
| 2021/0034865 A1* | 2/2021 | Nord | G06F 18/254 |
| 2023/0341513 A1* | 10/2023 | Gianelli | G01S 13/931 |

OTHER PUBLICATIONS

Lefferts, R., "Adaptive False Alarm Regulation in Double Threshold Radar Detection", IEEE Transactions on Aerospace and Electronic Systems, vol. AES-10, No. 5, Sep. 1, 1981.

Liu, J., "Modified Rao Test for Multichannel Adaptive Signal Detection", IEEE Transactions on Signal Processing, vol. 64, No. 3, Feb. 1, 2016.

Zhou, M., "Target Detection Based on Canonical Correlation Technique for Large Array MIMO Radar in Spatially Correlated Noise", 2020 IEEE 11th Sensor Array and Multichannel Signal Processing Workshop (SAM), pp. 1-5, Jun. 8, 2020.

* cited by examiner

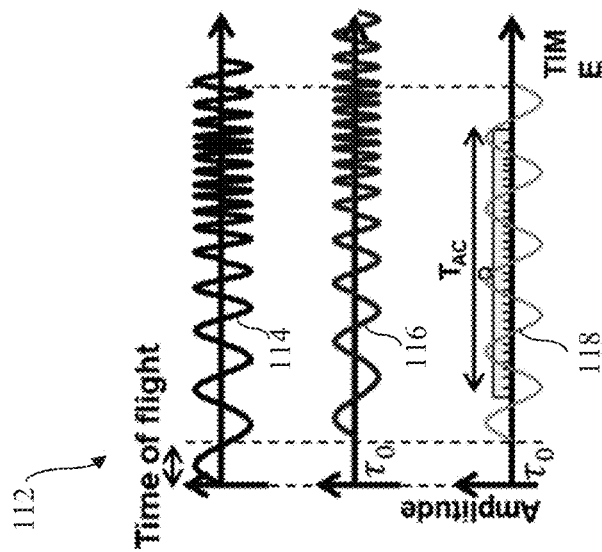
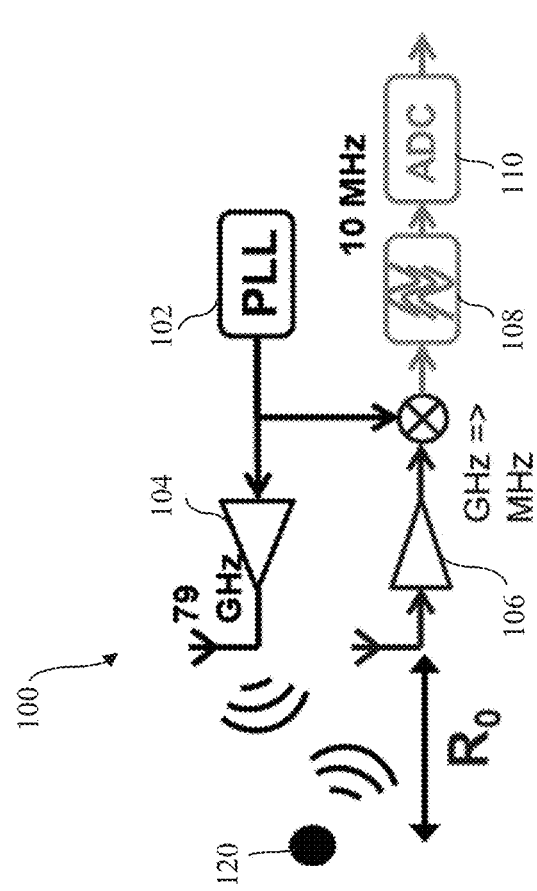
Fig. 1

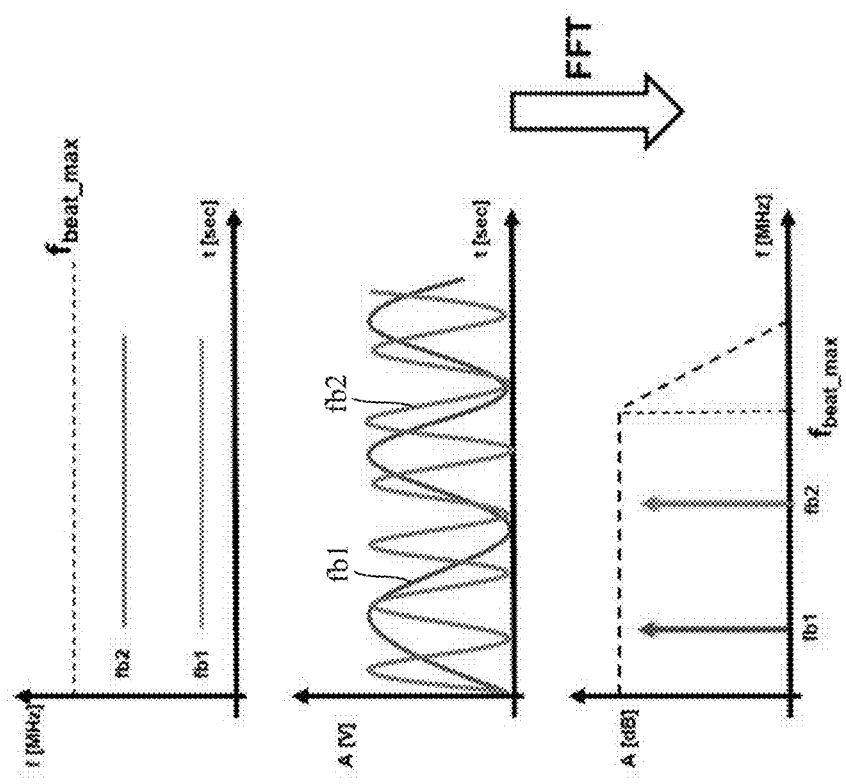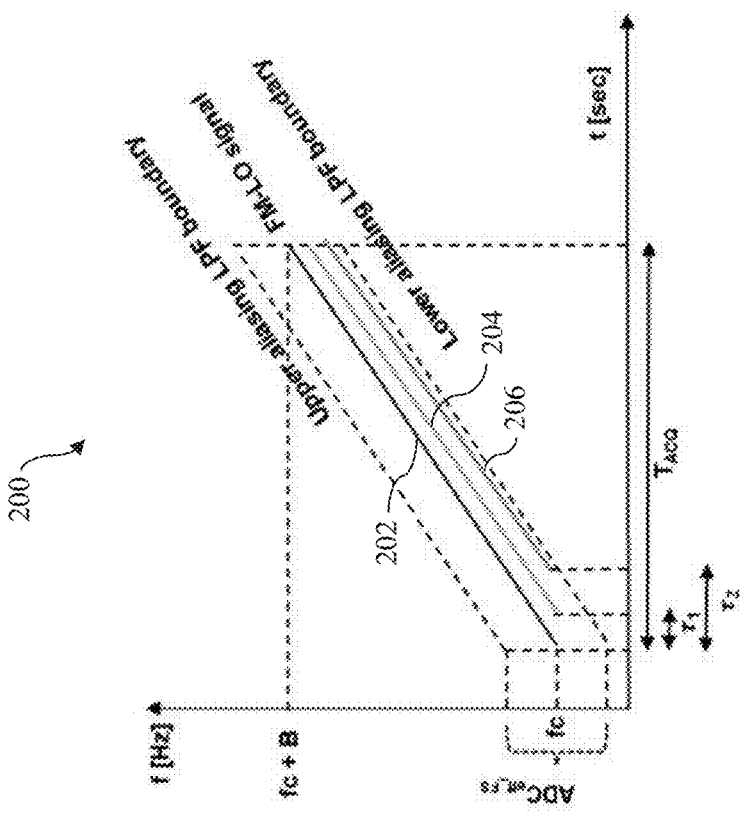
Fig. 2

RADAR SYSTEM AND CORRESPONDING OPERATING METHOD

CROSS-REFERENCE TO RELATED APPLICATIONS

This application claims the priority under 35 U.S.C. § 119 of European Patent application no. 22160101.6, filed on 3 Mar. 2022, the contents of which are incorporated by reference herein.

TECHNICAL FIELD

The present disclosure relates to a radar system. Furthermore, the present disclosure relates to a corresponding method of operating a radar system.

BACKGROUND

Radar systems may be used to detect the range and velocity of nearby targets. With various advances in technology, radar systems may now be applied in many different applications. For example, automotive radar systems are seen as crucial to increasing road safety. More specifically, automotive radar solutions for advanced driver assistance systems (ADAS) are currently being deployed on a large scale. These solutions can typically be grouped into long-range radar applications (LRR) and short-range radar (SRR) applications. Both of these applications typically use frequency modulated continuous wave (FMCW) modulation techniques in order to be able to identify a radar target, such as a car or a pedestrian. These radar systems typically utilize millimeter wave (mmW) frequencies for transmission and reception.

SUMMARY

In accordance with a first aspect of the present disclosure, a radar system is provided, comprising: a plurality of receive channels; a first radar detector stage configured to detect, through said receive channels, at least one target using a detector threshold; a noise correlation determination unit configured to determine a noise correlation level indicative of noise correlation between the receive channels if the first radar detector stage has detected the target; a detector threshold adjustment unit configured to adjust the detector threshold in dependence on the noise correlation level determined by the noise correlation determination unit; a second radar detector stage configured to detect the target using the adjusted detector threshold.

In one or more embodiments, the radar system is configured to conclude that the first radar detector stage has correctly detected the target if the second radar detector stage also detects said target.

In one or more embodiments, the radar system is configured to include said target in a radar target list upon or after concluding that the first radar detector stage has correctly detected the target.

In one or more embodiments, the radar system further comprises a processing unit configured to perform signal decoding and direction-of-arrival estimation upon or after the radar system has concluded that the first radar detector stage has correctly detected the target.

In one or more embodiments, the radar system is configured to discard the detection of the target by the first radar detector stage if the second radar detector stage has not detected said target.

In one or more embodiments, the noise correlation determination unit is configured to determine the noise correlation level by averaging elements of a correlation matrix of detected range bins for Doppler components of the receive channels excluding Doppler components at which the first radar detector stage has detected the target.

In one or more embodiments, the radar system further comprises a plurality of transmit channels, wherein the noise correlation level determined by the noise correlation determination unit is also indicative of the noise correlation between said transmit channels.

In one or more embodiments, the noise correlation level is indicative of a type of noise affecting the radar system.

In one or more embodiments, the type of noise is predominantly thermal noise if the noise correlation level is zero or close to zero.

In one or more embodiments, the type of noise is predominantly phase noise if the noise correlation level is significantly greater than zero.

In accordance with a second aspect of the present disclosure, a method of operating a radar system is conceived, the radar system comprising a plurality of receive channels, a first radar detector stage, a second radar detector stage, a noise correlation determination unit and a detector threshold adjustment unit, the method comprising: detecting, by the first radar detector stage through said receive channels, at least one target using a detector threshold; determining, by the noise correlation determination unit, a noise correlation level indicative of noise correlation between the receive channels if the first radar detector stage has detected the target; adjusting, by the detector threshold adjustment unit, the detector threshold in dependence on the noise correlation level determined by the noise correlation determination unit; detecting, by the second radar detector stage, the target using the adjusted detector threshold.

In one or more embodiments, the radar system concludes that the first radar detector stage has correctly detected the target if the second radar detector stage also detects said target.

In one or more embodiments, the radar system includes said target in a radar target list upon or after concluding that the first radar detector stage has correctly detected the target.

In one or more embodiments, a processing unit comprised in the radar system performs signal decoding and direction-of-arrival estimation upon or after the radar system has concluded that the first radar detector stage has correctly detected the target.

In one or more embodiments, the radar system discards the detection of the target by the first radar detector stage if the second radar detector stage has not detected said target.

DESCRIPTION OF DRAWINGS

Embodiments will be described in more detail with reference to the appended drawings.

FIG. 1 shows an example of an FMCW radar unit.

FIG. 2 shows an example of an FMCW radar signal and mixing process.

DESCRIPTION OF EMBODIMENTS

Figure 3A:
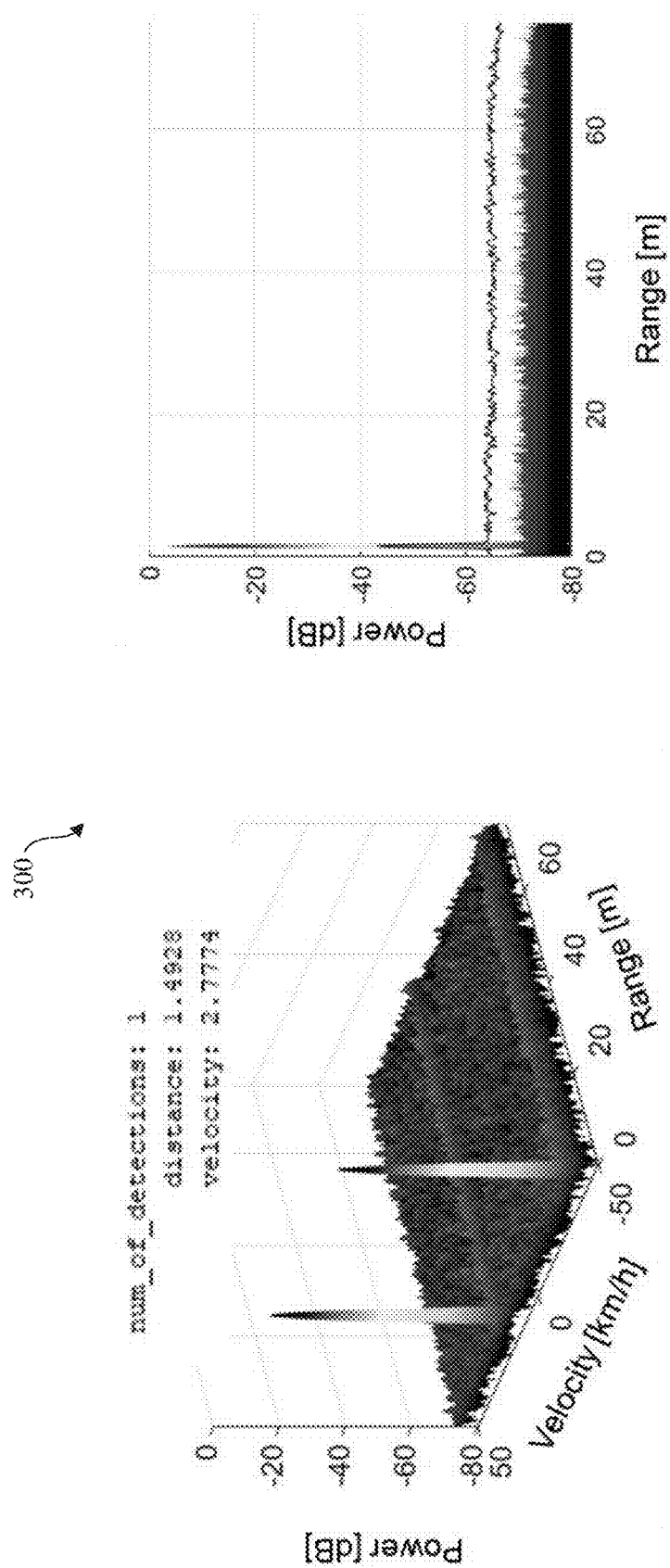
FIG. 3A shows an example of a Range-Doppler map without presence of phase noise.

As mentioned above, radar systems may be used to detect the range and velocity of nearby targets. With various advances in technology, radar systems may now be applied in many different applications. For example, automotive radar systems are seen as crucial to increasing road safety. More specifically, automotive radar solutions for advanced driver assistance systems (ADAS) are currently being deployed on a large scale. These solutions can typically be grouped into long-range radar applications (LRR) and short-range radar (SRR) applications. Both of these applications typically use frequency modulated continuous wave (FMCW) modulation techniques in order to be able to identify a radar target, such as a car or a pedestrian. These radar systems typically utilize millimeter wave (mmW) frequencies for transmission and reception.

To reduce the risk of false alarms in radar systems of the kind set forth, so-called constant false alarm rate (CFAR) detection may be applied. Constant false alarm rate (CFAR) detection refers to a common form of adaptive algorithm used in radar systems to detect target returns against a background of noise, clutter and interference. However, a CFAR radar detector works under the assumption that the noise is uncorrelated, which is indeed valid when the thermal noise is the dominating noise source. This assumption holds also in a MIMO radar system when the noise is uncorrelated among different receive channels. More specifically, when coherent or incoherent combining among the receive channels is performed it is possible to account for the uncorrelated nature of the noise in order to lower the CFAR threshold and boost radar target detection with a given false alarm rate. However, when system imperfection in the radar integrated circuit (IC) is present—i.e., if phase noise can be identified as the dominating source of distortion—the statistics of the noise change. In particular, over the channel domain the noise will experience some sort of correlation, which will partially invalidate the underlying assumption of the CFAR detector. Thus, when phase noise dominates with respect to thermal noise false detection can arise due to a detector threshold which is too low with respect to the correlated nature of the noise, which will now also benefit from the incoherent/coherent gain over the channel domain.

FIG. 1 shows an example of an FMCW radar unit 100. In particular, the left part of FIG. 1 shows components of the FMCW radar unit 100 in schematic form. The radar unit 100 comprises a phase-locked loop (PLL) 102, an amplifier 104 in a transmit path of the radar unit 100, another amplifier 106 in a receive path of the radar unit 100, an analogue filter 108 and an analog-to-digital converter (ADC) 110. Furthermore, the right part of FIG. 1 shows a timing diagram of various internal signals 112 of the radar unit 100. In particular, a transmitted signal 114 is shown, a received signal 116, and an amplified and down-mixed signal 118. In operation, the PLL 102 generates the time-variant signal (frequency ramp) directly at the RF carrier (e.g., 79 GHz). It is noted that this example represents a simplification, because the ramp is typically generated at a lower frequency. In that case, a doubler or trippler stage is used to achieve the desired frequency. The FMCW signal (after amplification) interacts with a target 120 in the environment and comes back at the RX antenna. The received signal 116 is amplified and down-mixed using the same TX signal 114 (this involves a translation from radio frequency (RF) to intermediate frequency (IF), i.e., from the GHz domain to the MHz domain). The analogue filter 108 is used to limit the amount of noise and to limit the maximum receivable IF frequency. Furthermore, the ADC 110 is used to sample the signal. The transmitted signal 114 can be expressed as shown in equation 1.

$$S_{TX}(t)=e^{j(2\pi f_c t + \pi \alpha t^2 + \theta)} \quad \text{(Eq. 1)}$$

In equation 1, fc represents the transmitted carrier frequency, t represents the temporal vector, and $\alpha$ represents the so-called chirp rate B/T. Furthermore, B represent the FMCW frequency deviation and T represents the chirp duration. Furthermore, the received signal 116, after backscattering from an object at a distance $\tau$, can be expressed as shown in equation 2.

$$S_{RX}(t)=e^{j(2\pi f_c(t-\tau) + \pi \alpha (t-\tau)^2 + \theta)} \quad \text{(Eq. 2)}$$

It is noted that the results of the classical FMCW down mixing and filtering procedure is the so-called radar beat frequency. The information of the target delay is embedded in the frequency content of the signal in the intermediate frequency domain. This signal, i.e., the amplified and down-mixed signal 118, can be expressed as shown in equation 3.

$$S_{IF}(t)=e^{j(2\pi f_c \tau + 2\pi f_b t - \pi \alpha \tau^2)} \quad \text{(Eq. 3)}$$

In equation 3, the term IF stands for intermediate frequency, and $f_b$ is the beat frequency. Solving the mixing equation, the relation between beat frequency and target range can be expressed as shown in equation 4, in which R represents the target range, c represents the speed of light and $T_{ramp}$ represents the chirp linear frequency deviation.

$$f_b = \frac{2BR}{cT_{ramp}} \quad \text{(Eq. 4)}$$

FIG. 2 shows an example of an FMCW radar signal and mixing process 200. In particular, a visual example of the mixing procedure is shown. The left part of FIG. 2 shows the time-frequency plot, the linear signal 202 generated by the PLL is visible (indicated as the FM-LO signal), as well as two delayed versions 204, 206 of the linear signal 202, representing two targets at delays $\tau_1$ and $\tau_2$ respectively. Furthermore, the right part of FIG. 2 shows the frequency and time representation of the beat signals produced by the two targets, and their translation into $f_{b1}$ and $f_{b2}$.

Considering a non-ideal system, the transmitted and received signals can be rewritten as shown in equations 5 and 6.

$$S_{TX}(t)=e^{j(2\pi f_c t + \pi \alpha t^2 + \varphi(t))} \quad \text{(Eq. 5)}$$

$$S_{RX}(t)=e^{j(2\pi f_c(t-\tau) + \pi \alpha (t-\tau)^2 + \varphi(t-\tau))} \quad \text{(Eq. 6)}$$

In equations 5 and 6, the term $\varphi$ represents the system phase noise. It is noted that phase noise can be identified as one of the dominating sources of distortion in FMCW radar systems. The resulting beat frequency can be expressed as shown in equation 7.

$$S_{IF}(t)=e^{j(2\pi f_c \tau + 2\pi f_b t - \pi \alpha \tau^2 + \varphi(t) - \varphi(t-\tau))} \quad \text{(Eq. 7)}$$

Internal leakage usually refers to the signal that directly enters the receiver path. This signal contribution manifests itself close to direct current due to its small propagation delay. The internal leakage is usually mitigated by a high pass filter, or by other digital cancelation techniques, but parts of the signal corresponding to the phase noise are wideband and are not strongly attenuated by the high pass filter. Another source of phase noise is the presence of static nearby objects (such as a car bumper); this type is usually called short-range leakage. Short-range leakage is usually compensated by an artificial on-chip-target (OCT). However, for beat frequencies that do not fall in the short range, the aforementioned methods cannot be applied. Therefore, the time-of-flight dependent phase noise is the result of the difference between the phase noise present in the transmitted signal and the one associated after a delay $\tau_d$. Under this assumption the unwanted behaviors associated with an excess of phase noise are still present. Without losing generality, a formula that describes the phase noise after the mixing operation in the described radar transceiver architecture can be expressed as shown in equation 8.

$$L_{IF}(f_m) = L_{TX}(f_m) 4\pi \sin^2(\pi f_m \tau_d) \qquad \text{(Eq. 8)}$$

In equation 8, $L_{TX}(f_m)$ is the phase noise generated by the transmitted radar chain, $f_m$ is the frequency offset from the carrier frequency at which the phase noise is being measured, and $\tau_d$ is the target-associated delay. Furthermore, $L_{IF}(f_m)$ is the phase noise in the IF bandwidth of the radar receiver chain. It is noted that the amplitude/power level and shape of the phase noise depends on the amplitude/power of the received signal and the delay associated to each individual reflection will create an additional noise pattern which is unique for every beat frequency.

An excess of phase noise in the resulting beat frequency might lead to several undesired behaviors, such as false target detections, a loss of sensitivity and radar dynamic range, and a broadening of the detection peak. The effect of false target detections may be seen in the output radar target list in which non-real objects will be present (with wrong range/velocity/angle information) as a result of excess of correlated noise components in the received signal. Furthermore, the loss of sensitivity and radar dynamic range affects the ability of weak detections (such as detections of vulnerable road users) in the near proximity of strong detections (such as detections of trucks and the road environment). Finally, the lower signal-to-noise ratio induced by the presence of phase noise may lead to a loss of resolution and a poor peak detection.

Figure 3B:
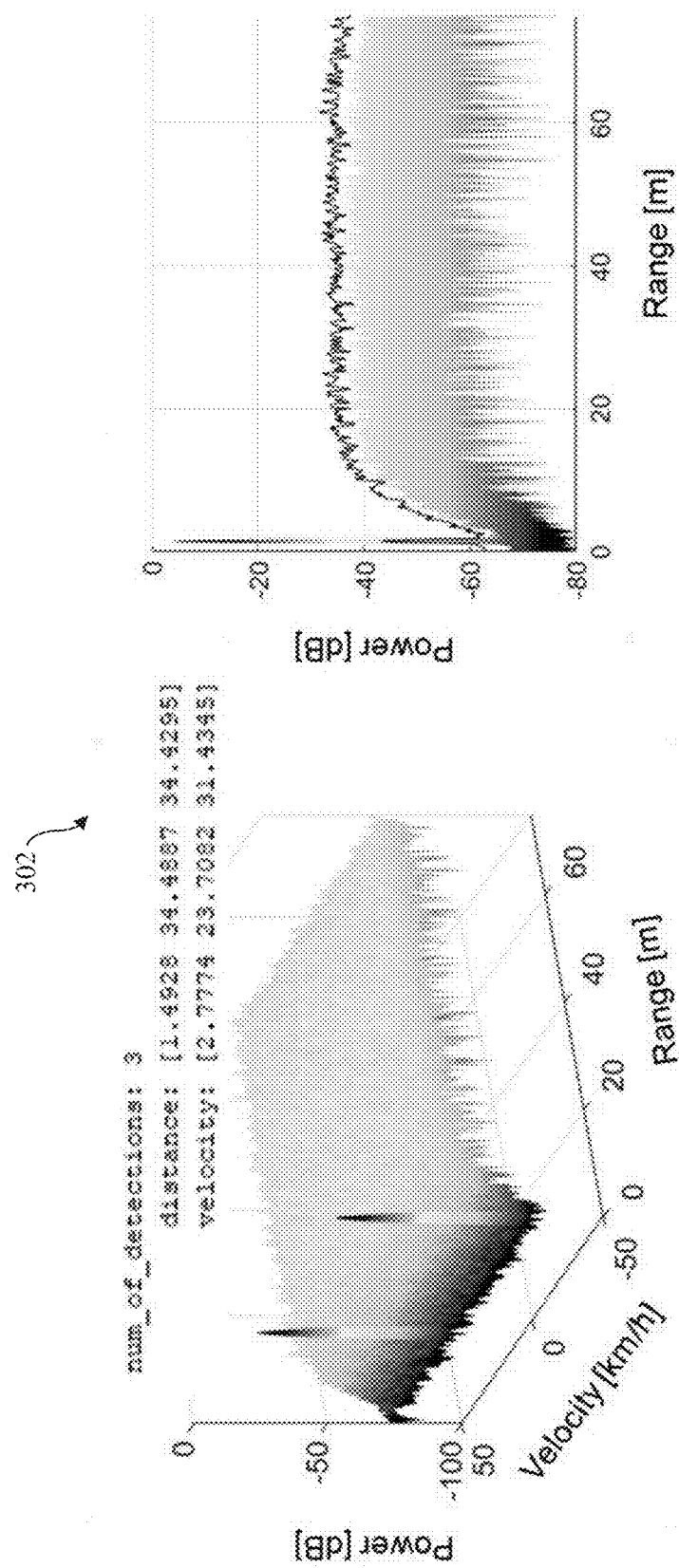
FIG. 3B shows an example of a Range-Doppler map with presence of phase noise.

FIGS. 3A and 3B show an example 300 of a Range-Doppler map without presence of phase noise, and an example 302 of a Range-Doppler map with presence of phase noise, respectively. In particular, it is clear from FIGS. 3A and 3B that an excess of phase noise manifests itself with two additional targets in the detection list, as well as with an increase of the overall system noise behavior.

Now discussed are a radar system and a corresponding method of operating a radar system, which facilitate reducing the number of false target detections caused by an excess of phase noise.

Figure 4:
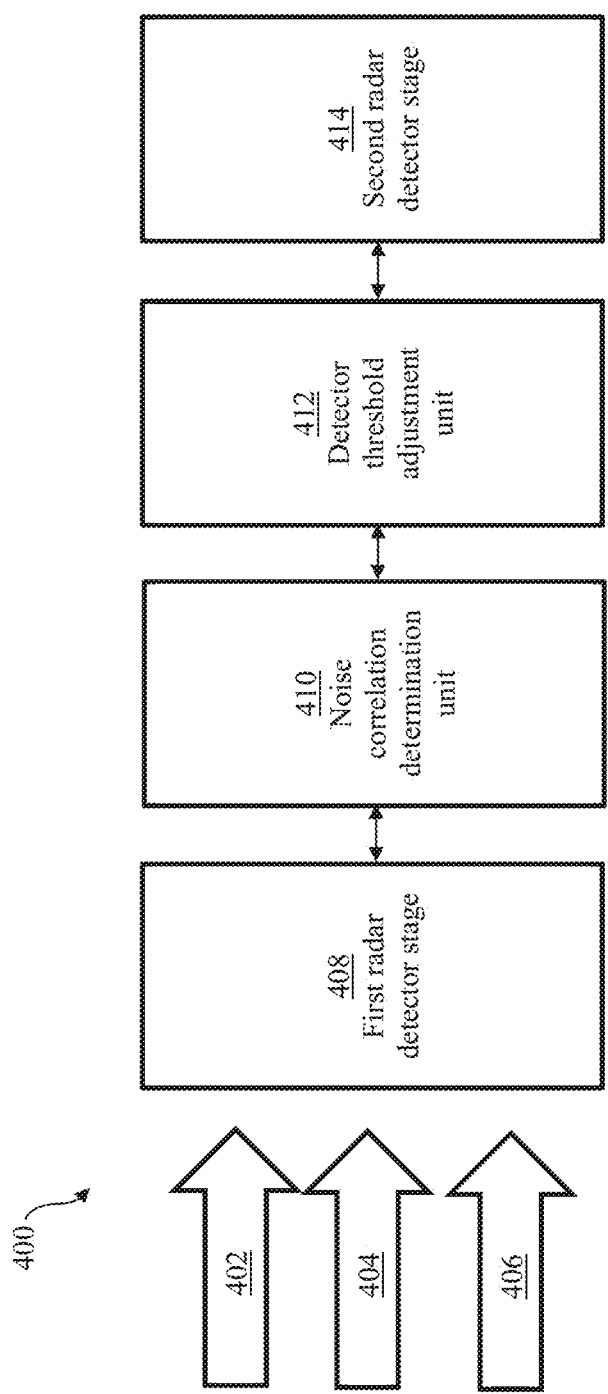
FIG. 4 shows an illustrative embodiment of a radar system.

FIG. 4 shows an illustrative embodiment of a radar system 400. The system 400 comprises a plurality of receive channels 402, 404, 406. Furthermore, the system 400 comprises a first radar detector stage 408 configured to detect, through said receive channels 402, 404, 406, at least one target using a detector threshold. In particular, the first radar detector stage 408 may be configured to detect said target through a coherent or incoherent combination of said receive channels 402, 404, 406. In addition, the system 400 comprises a noise correlation determination unit 410 configured to determine a noise correlation level indicative of noise correlation between the receive channels 402, 404, 406 if the first radar detector stage 408 has detected the target. Furthermore, the system 400 comprises a detector threshold adjustment unit 412 configured to adjust the detector threshold in dependence on the noise correlation level determined by the noise correlation determination unit 410. Finally, the system 400 comprises a second radar detector stage 414 configured to detect the target using the adjusted detector threshold. By adjusting the detector threshold in dependence on the noise correlation level between the different receive channels 402, 404, 406, the number of false target detections caused by an excess of phase noise may be reduced.

In one or more embodiments, the radar system is further configured to conclude that the first radar stage has correctly detected the target if the second radar detector stage also detects said target. In this way, the detection by the first radar detector stage may easily be confirmed while the risk of false target detections caused by an excess of phase noise is reduced by taking into account the noise correlation between the different receive channels. In one or more embodiments, the radar system is further configured to include said target in a radar target list upon or after concluding that the first radar detector stage has correctly detected the target. In this way, a radar target list may be built that contains less falsely detected targets. In one or more embodiments, the radar system further comprises a processing unit configured to perform signal decoding and direction-of-arrival estimation upon or after the radar system has concluded that the first radar detector stage has correctly detected the target. In this way, unnecessary signal decoding and direction-of-arrival estimation operations on falsely detected targets may be avoided. The skilled person will appreciate that taking the conclusion on the correct detection of the target and including the target in the radar target list may be carried out by the same processing unit that performs the signal decoding and direction-of-arrival estimation. Alternatively, the radar system may comprise a separate decision unit for taking said conclusion and including the target in the radar target list.

In one or more embodiments, the radar system is further configured to discard the detection of the target by the first radar detector stage if the second radar detector stage has not detected said target. In this way, it may easily be avoided that further operations are performed on falsely detected targets, such as including a falsely detected target in a radar target list. This, in turn, further reduces the risk of false target detections. Furthermore, in one or more embodiments, the noise correlation determination unit is configured to determine the noise correlation level by averaging elements of a correlation matrix of detected range bins for Doppler components of the receive channels, excluding Doppler components at which the first radar detector stage has detected the target. More specifically, indices in the Doppler dimension at which the first detector has indicated the presence of a target are excluded from the averaging operation. This results in a practical implementation of the noise correlation level determination. In one or more embodiments, the radar system further comprises a plurality of transmit channels, wherein the noise correlation level determined by the noise correlation determination unit is also indicative of the noise correlation between said transmit channels. By also taking into account the noise correlation between different transmit channels, the number of false target detections caused by an excess of phase noise may be further reduced.

In one or more embodiments, the noise correlation level is indicative of a type of noise affecting the radar system. More specifically, the type of noise may be predominantly thermal noise if the noise correlation level is zero or close to zero. Furthermore, the type of noise may be predominantly phase noise if the noise correlation level is significantly greater than zero. Since the noise correlation level may indicate that the type of noise is predominantly thermal noise or phase noise, said level may effectively be used as a parameter to adjust the detector threshold used by the second radar detector stage. Accordingly, the number of false target detections caused by an excess of phase noise may easily be reduced.

Thus, a practical implementation of the presently disclosed radar system may eliminate or at least reduce the number of false positives in a radar target list. The practical implementation may include a first radar detector stage, a noise correlation calculator, and an optimal detector threshold finder followed by a second and final radar detector stage. The first radar detector may be a standard radar detector used to check the presence of a possible target which competes against the system/environmental noise sources. When a target detection has occurred, a digital signal processing method may determine the noise correlation level among channels of the radar system (e.g., a multiple-input multiple-output radar system). This may be carried out by calculating the average correlation matrix of the detected range bins, for all the Doppler components excluding those components at which the target has been detected, for all the radar channels. The calculated correlation level may then be used to adjust the radar detector threshold in order to account for colored noise statistics. After the threshold adjustment the second radar detector stage may use the pre-calculated modified threshold, and the output of the second radar detector stage may either confirm that the target detection is correct or indicate that the target detection is incorrect. Finally, standard processing may be applied after the second radar detector stage in order to obtain the radar target list.

Figure 5:
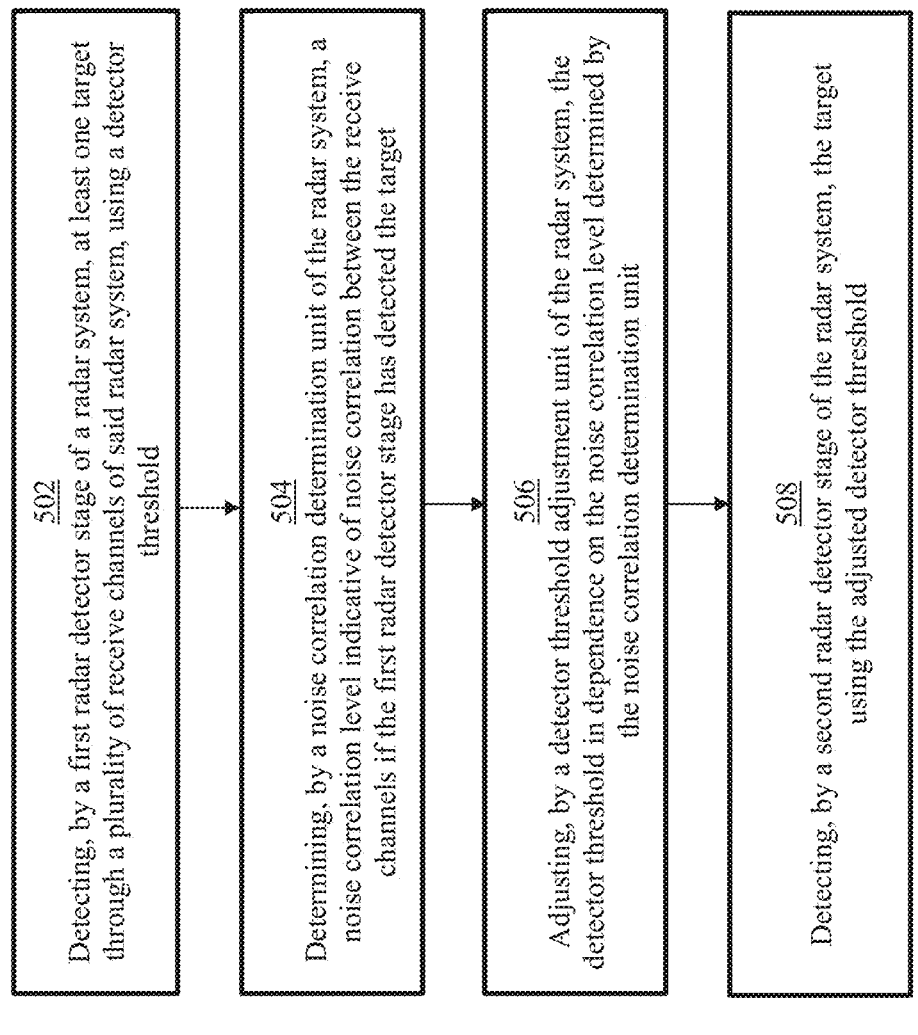
FIG. 5 shows an illustrative embodiment of a method of operating a radar system.

FIG. 5 shows an illustrative embodiment of a method 500 of operating a radar system. The method 500 comprises the following steps. At 502, a first radar detector stage of a radar system detects, using a detector threshold, at least one target through a plurality of receive channels of said radar system. At 504, a noise correlation determination unit of the radar system determines a noise correlation level indicative of noise correlation between the receive channels if the first radar detector stage has detected the target. Furthermore, at 506, a detector threshold adjustment unit of the radar system adjusts the detector threshold in dependence on the noise correlation level determined by the noise correlation determination unit. Finally, at 508, a second radar detector stage of the radar system detects the target using the adjusted detector threshold. As mentioned above, by adjusting the detector threshold in dependence on the noise correlation level between the different receive channels, the number of false target detections caused by an excess of phase noise may be reduced.

Figure 6:
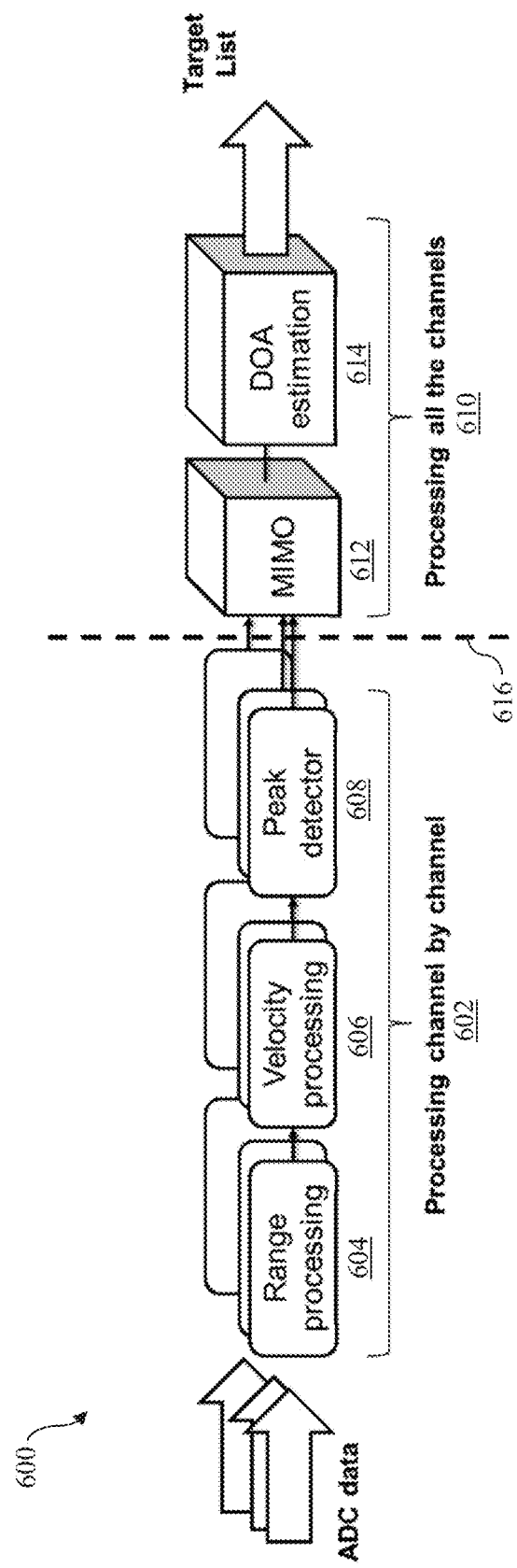
FIG. 6 shows an illustrative embodiment of FMCW digital signal processing.

FIG. 6 shows an illustrative embodiment of FMCW digital signal processing 600. The acquired raw ADC samples are processed 602 by several stages in a channel-by-channel fashion. First range processing 604 is executed followed by velocity processing 606. Both of these processing stages typically make use of standard windowed fast Fourier transforms (FFTs). The peak detector 608 usually determines the presence of a possible radar target by comparing the amplitude of each range-Doppler bin with a calculated noise-based threshold. This usually takes place after coherent/incoherent combining the signal over multiple antenna channels. After a detection has occurred subsequent MIMO processing 612 and direction-of-arrival (DOA) estimation 614 are performed on all channels 610 with the aim of generating the radar target list.

Figure 7:
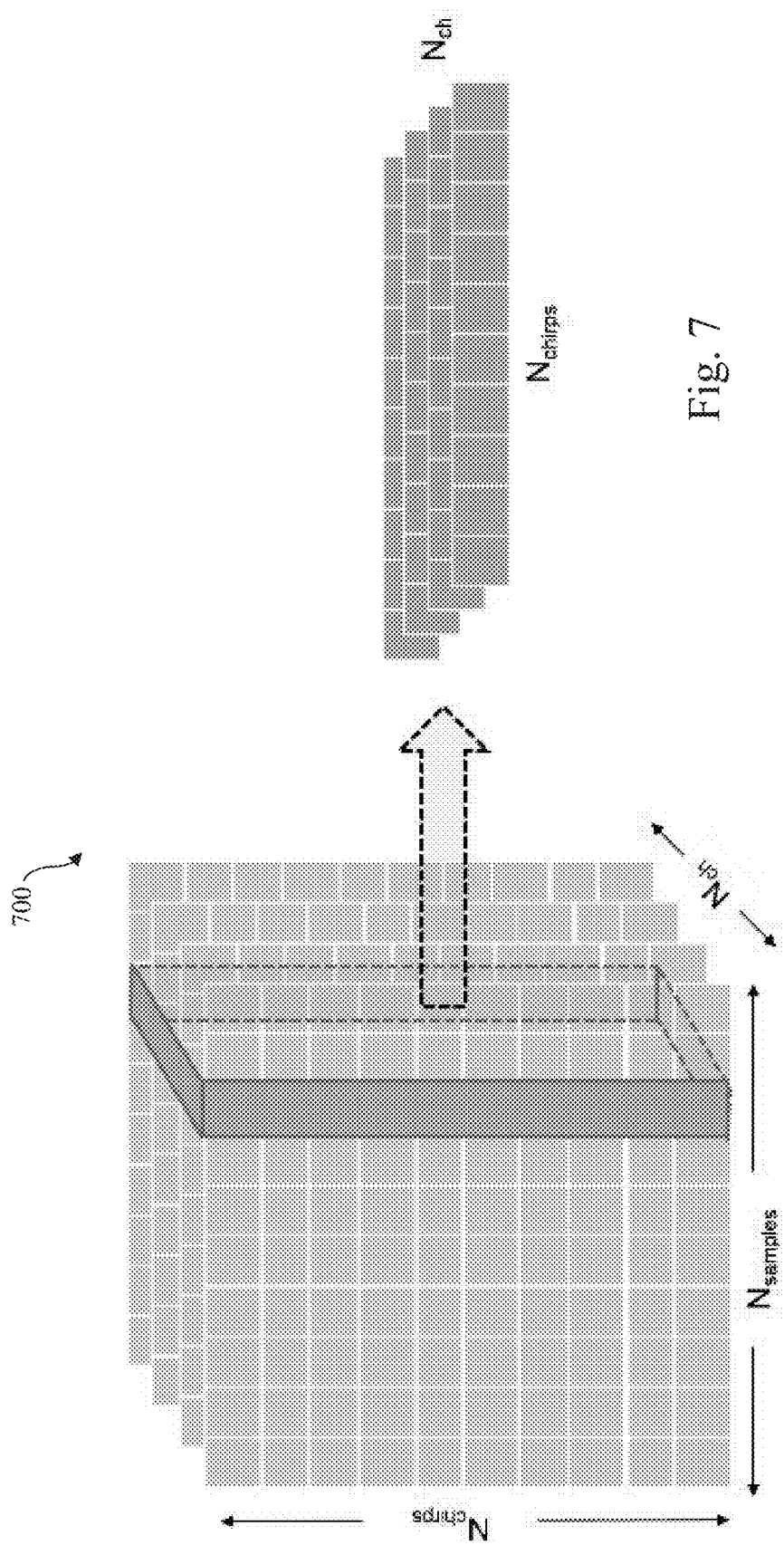
FIG. 7 shows an illustrative embodiment of the construction of a correlation matrix.

FIG. 7 shows an illustrative embodiment of the construction of a correlation matrix 700. After a positive radar detection (i.e., an order statistic-CFAR detection) the tested range gate may be used to calculate the correlation of the noise among all the receiver channels. The matrix under test has size $N_{ch} \times N_{chirps}$, where $N_{ch}$ is the number of physical receiver channels, while $N_{chirps}$ is the number of chirps contained in the radar frame. The correlation coefficient is a measure of the linear dependency among the variables of which the correlation should be calculated. If, for the sake of simplicity, only four channels are considered, the correlation coefficient can be calculated as shown in equation 9.

$$\rho(ch_1, ch_2, ch_3, ch_4) = \frac{cov\ (ch_1, ch_2, ch_3, ch_4)}{\sigma(ch_1)\sigma(ch_2)\sigma(ch_3)\sigma(ch_4)} \quad \text{(Eq. 9)}$$

In equation 9, the term cov(·) represents the covariance of x and y, while σ (·) defines the standard deviation of x and y, respectively. Given the fact that each variable is directly correlated to itself, the correlation coefficient matrix may be expressed as shown in equation 10.

$$R = \begin{pmatrix} 1 & \rho(ch_1, ch_2) & \rho(ch_1, ch_3) & \rho(ch_1, ch_4) \\ \rho(ch_2, ch_1) & 1 & \rho(ch_2, ch_3) & \rho(ch_2, 4) \\ \rho(ch_3, ch_1) & \rho(ch_3, ch_2) & 1 & \rho(ch_3, ch_4) \\ \rho(ch_4, ch_1) & \rho(ch_4, ch_2) & \rho(ch_4, ch_3) & 1 \end{pmatrix} \quad \text{(Eq. 10)}$$

Averaging the non-diagonal elements of the correlation matrix gives a measure of the average correlation level experienced by all the channels in that particular range gate. The maximum correlation level (assuming that all channel noise is perfectly correlated) is then $N^2_{ch} - N_{ch}$. In the example the maximum correlation level is 12.

Figure 8:
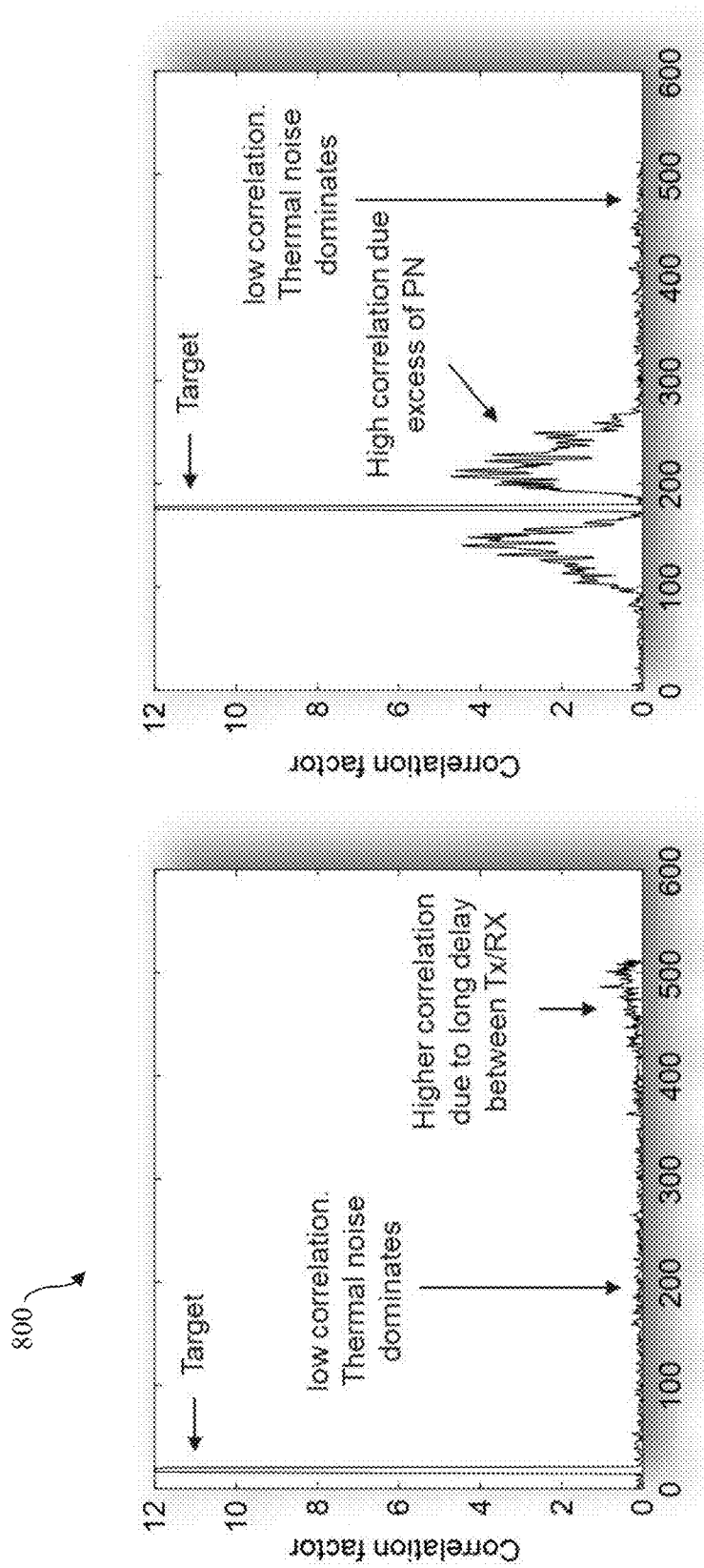
FIG. 8 shows an illustrative embodiment of a calculated correlation factor.

FIG. 8 shows an illustrative embodiment of a calculated correlation factor 800. The underlying assumption is that the correlation coefficient is calculated for each individual range gate, even if no target detection has occurred. When the correlation level is close to zero the thermal noise is the noise source that dominates the system, while every other value greater than zero and lower than a maximum correlation level (targets) expresses an excess of phase noise that may lead to false or missed detections. The calculated normalized correlation factor may be used to adjust the threshold of the radar detector in order to account for the excess of correlated noise. For a particular range gate k (k=1 ... $N_{samples}$), the modified threshold may be calculated as shown in equation 11. In equation 11, $THLD_k$ represents the threshold, $THLD_{adj\_k}$ represents the modified threshold, and $nCF_k$ represents the normalized correlation factor. It is noted that normalization is performed by scaling the correlation factor by the number of non-diagonal elements of the correlation coefficient matrix. For example, if there are four transmitters (NTx=4) and four receivers (NRx=4), then the scaling factor is NTx*NRx-NTx=4*4−4=12.

$$THLD_{adj\_k} = THLD_k + nCF_k \quad \text{(Eq. 11)}$$

Figure 9:
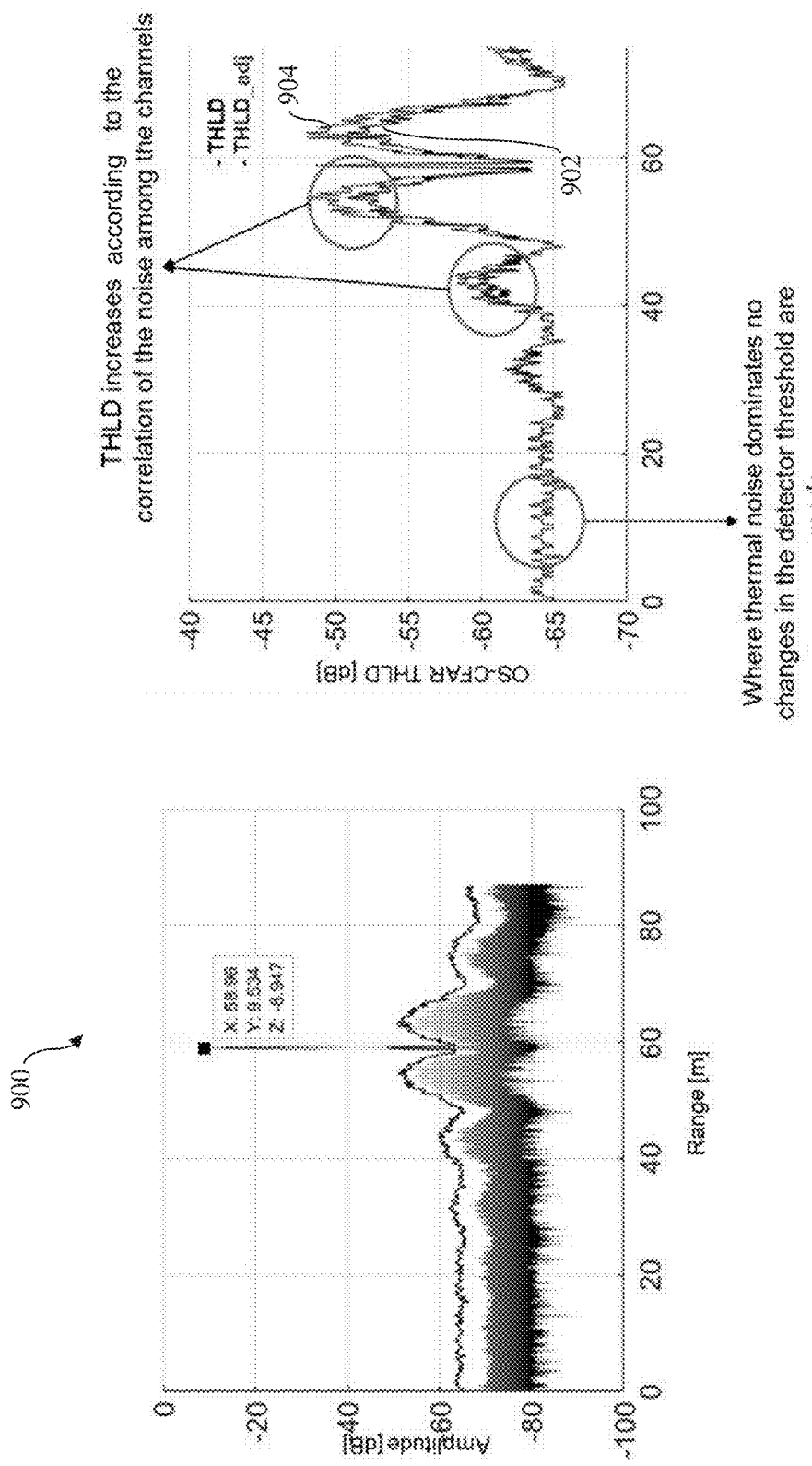
FIG. 9 shows an illustrative embodiment of a detector threshold adjustment.

FIG. 9 shows an illustrative embodiment of a detector threshold adjustment 900. In particular, an example is shown of the effectiveness of the presently disclosed radar system and corresponding operation method. More specifically, the left part of FIG. 9 shows that an excess of phase noise is present, while the right part shows a comparison between the default threshold (THLD) 902 calculated under the assumption of uncorrelated noise and an adjusted threshold (THLD_adj) 904, wherein the latter has been adjusted in dependence on a determined noise correlation level.

Figure 10:
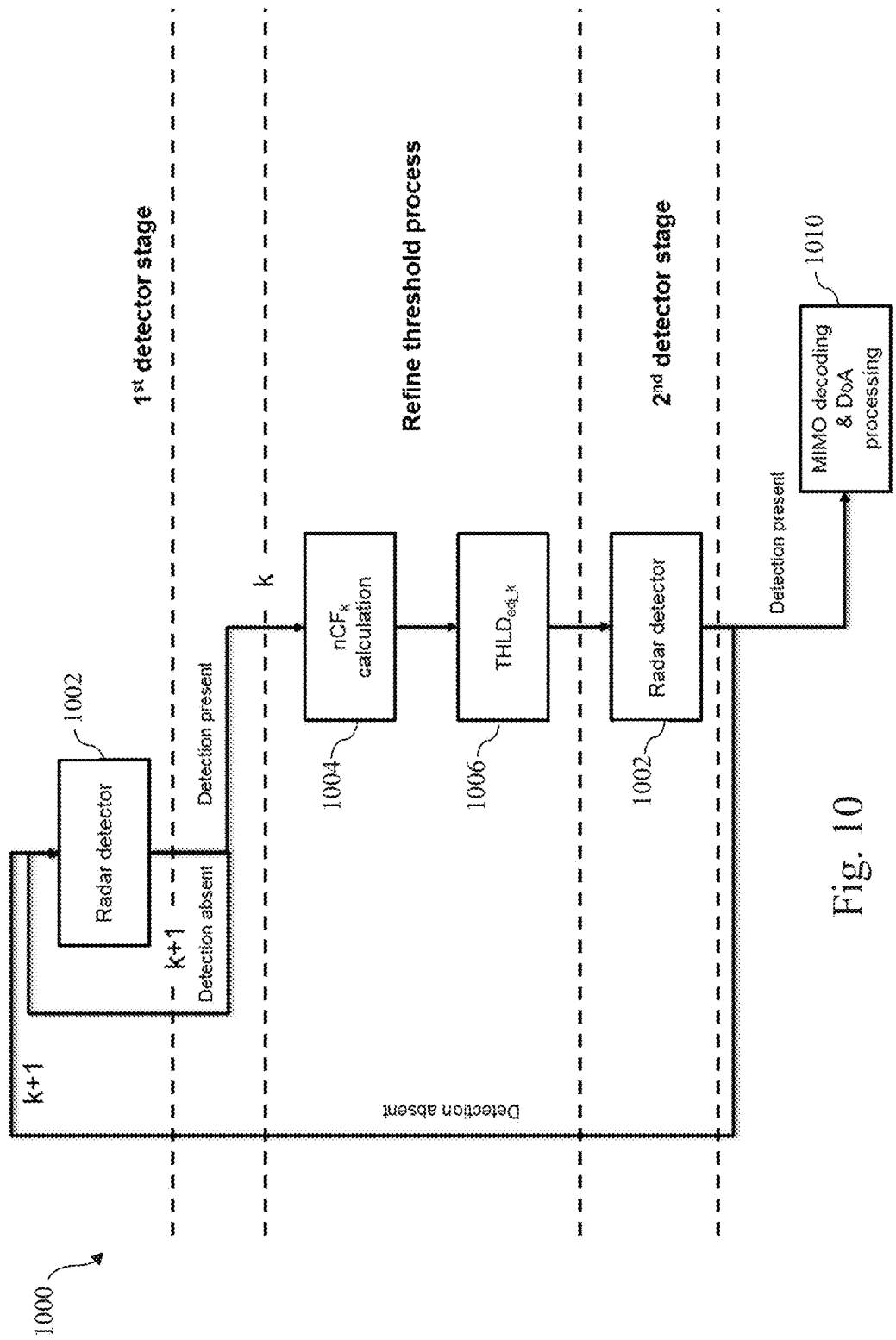
FIG. 10 shows an illustrative embodiment of an adaptive radar detection process.

FIG. 10 shows an illustrative embodiment of an adaptive radar detection process. The radar detector 1002 searches for power values above a pre-determined threshold for all the Doppler bins, for a given range gate k. If no detections have occurred ("Detection absent") the range gate k+1 will be analyzed. If a detection is has occurred ("Detection present") the normalized correlation factor is calculated 1004 according to equation 12. In equation 12, NTx represents the number of transmitters, NRx represents the number of receivers, and Non-Diagonal(R) represents the non-diagonal elements of the correlation coefficient matrix. The threshold will be modified 1006 accordingly with the calculated normalized correlation factor. The radar detector 1002 is then re-evaluated with the modified threshold (i.e., with the adjusted threshold). Thus, in this example the same radar detector 1002 is used to execute both the first radar detector stage and the second radar detector stage, with different thresholds being applied. However, the skilled person will appreciate that in principle also different radar detectors (i.e., different devices or units) may be used to execute the first radar detector stage and the second radar detector stage. If no detections have occurred ("Detection absent") the range gate k+1 will be analyzed, and the previous detection will be discarded. If a detection has occurred ("Detection present") the next steps in the radar processing chain are executed, in particular MIMO decoding and DOA processing/estimation 1010.

$$nCF_k = \frac{\text{Non-Diagonal}(R)}{NTx * NRx - NTx} \quad \text{(Eq. 12)}$$

As mentioned above, the radar system may further comprise a plurality of transmit channels, wherein the noise correlation level determined by the noise correlation determination unit is also indicative of the noise correlation between said transmit channels. Thus, the MIMO operation may be included in the process as well. In that case, the amount of correlation that can also be experienced by the different transmit channels may be taken into account as well, and the correlation coefficient matrix may be expressed as shown in equation 13.

$$R = \underbrace{\begin{pmatrix} 1 & \rho(ch_1, ch_2) & \rho(ch_1, ch_3) & \rho(ch_1, ch_4) \\ \rho(ch_2, ch_1) & 1 & \rho(ch_2, ch_3) & \rho(ch_2, 4) \\ \rho(ch_3, ch_1) & \rho(ch_3, ch_2) & 1 & \rho(ch_3, ch_4) \\ \rho(ch_4, ch_1) & \rho(ch_4, ch_2) & \rho(ch_4, ch_3) & 1 \end{pmatrix}}_{TX_1} \quad \text{(Eq. 13)}$$

$$\underbrace{\begin{pmatrix} 1 & \rho(ch_1, ch_2) & \rho(ch_1, ch_3) & \rho(ch_1, ch_4) \\ \rho(ch_2, ch_1) & 1 & \rho(ch_2, ch_3) & \rho(ch_2, 4) \\ \rho(ch_3, ch_1) & \rho(ch_3, ch_2) & 1 & \rho(ch_3, ch_4) \\ \rho(ch_4, ch_1) & \rho(ch_4, ch_2) & \rho(ch_4, ch_3) & 1 \end{pmatrix}}_{TX_2}$$

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 FMCW radar unit
102 phase-locked loop
104 amplifier
106 amplifier
108 analogue filter
110 analog-to-digital converter
112 signals
114 transmitted signal
116 received signal
118 amplified and down-mixed signal
120 target
200 FMCW radar signal and mixing process
202 linear signal generated by the PLL
204 first delayed version of the linear signal
206 second delayed version of the linear signal
300 Range-Doppler map without presence of phase noise
302 Range-Doppler map with presence of phase noise
400 radar system
402 receive channel
404 receive channel 406 receive channel
408 first radar detector stage
410 noise correlation determination unit
412 detector threshold adjustment unit
414 second radar detector stage
500 method of operating a radar system
502 detecting, by a first radar detector stage of a radar system, at least one target through a plurality of receive channels of said radar system, using a detector threshold
504 determining, by a noise correlation determination unit of the radar system, a noise correlation level indicative of noise correlation between the receive channels if the first radar detector stage has detected the target
506 adjusting, by a detector threshold adjustment unit of the radar system, the detector threshold in dependence on the noise correlation level determined by the noise correlation determination unit
508 detecting, by a second radar detector stage of the radar system, the target using the adjusted detector threshold
600 FMCW digital signal processing
602 processing channel by channel
604 range processing
606 velocity processing
608 peak detector
610 processing all the channels
612 MIMO processing
614 DOA estimation
616 transition in processing
700 construction of a correlation matrix
800 calculated correlation factor
900 detector threshold adjustment
902 default threshold
904 adjusted threshold
1000 adaptive radar detection process
1002 first radar detector stage
1004 normalized correlation factor calculation
1006 detector threshold adjustment
1008 second radar detector stage
1010 MIMO decoding and DOA processing

The invention claimed is:

1. A radar system, comprising:
a plurality of receive channels;
a first radar detector stage configured to detect, through said receive channels, a target using a detector threshold, wherein the target is one of a correctly detected target or a falsely detected target;
a noise correlation determination unit configured to determine a noise correlation level indicative of noise correlation between the receive channels if the first radar detector stage has detected the target, wherein the noise correlation determination unit is configured to determine the noise correlation level by averaging elements of a correlation matrix of detected range bins for Doppler components of the receive channels excluding Doppler components at which the first radar detector stage has detected the target;
a detector threshold adjustment unit configured to adjust the detector threshold in dependence on the noise correlation level determined by the noise correlation determination unit;
a second radar detector stage configured to detect the target using the adjusted detector threshold.

2. The radar system of claim 1, being configured to conclude that the first radar detector stage has correctly detected the target if the second radar detector stage also detects said target.

3. The radar system of claim 2, being configured to include said target in a radar target list upon or after concluding that the first radar detector stage has correctly detected the target.

4. The radar system of claim 2, further comprising a processing unit configured to perform signal decoding and direction-of-arrival estimation upon or after the radar system has concluded that the first radar detector stage has correctly detected the target.

5. The radar system of claim 1, being configured to discard the detection of the target by the first radar detector stage if the second radar detector stage has not detected said target.

6. The radar system of claim 1, further comprising a plurality of transmit channels, wherein the noise correlation level determined by the noise correlation determination unit is also indicative of the noise correlation between said transmit channels.

7. The radar system of claim 1, wherein the noise correlation level is indicative of a type of noise affecting the radar system.

8. The radar system of claim 7, wherein the type of noise is predominantly thermal noise if the noise correlation level is zero or close to zero.

9. The radar system of claim 7, wherein the type of noise is predominantly phase noise if the noise correlation level is significantly greater than zero.

10. A method of operating a radar system, the radar system comprising a plurality of receive channels, a first radar detector stage, a second radar detector stage, a noise correlation determination unit and a detector threshold adjustment unit, the method comprising:
detecting, by the first radar detector stage through said receive channels, a target using a detector threshold, wherein the target is one of a correctly detected target or a falsely detected target;
determining, by the noise correlation determination unit, a noise correlation level indicative of noise correlation between the receive channels if the first radar detector stage has detected the target, wherein the determining the noise correlation level includes averaging elements of a correlation matrix of detected range bins for Doppler components of the receive channels excluding Doppler components at which the first radar detector stage has detected the target;
adjusting, by the detector threshold adjustment unit, the detector threshold in dependence on the noise correlation level determined by the noise correlation determination unit;
detecting, by the second radar detector stage, the target using the adjusted detector threshold.

11. The method of claim 10, wherein the radar system concludes that the first radar detector stage has correctly detected the target if the second radar detector stage also detects said target.

12. The method of claim 11, wherein the radar system includes said target in a radar target list upon or after concluding that the first radar detector stage has correctly detected the target.

13. The method of claim 11, wherein a processing unit comprised in the radar system performs signal decoding and direction-of-arrival estimation upon or after the radar system has concluded that the first radar detector stage has correctly detected the target.

14. The method of claim 10, wherein the radar system discards the detection of the target by the first radar detector stage if the second radar detector stage has not detected said target.

15. The method of claim 10, wherein the radar system further comprises a plurality of transmit channels, and wherein the determining the noise correlation level is also indicative of the noise correlation between said transmit channels.

16. The method of claim 10, wherein the determined noise correlation level is indicative of a type of noise affecting the radar system.

17. The method of claim 16, wherein the type of noise is predominantly thermal noise if the noise correlation level is zero or close to zero.

18. The method of claim 16, wherein the type of noise is predominantly phase noise if the noise correlation level is significantly greater than zero.

\* \* \* \* \*